United States Patent
Seong

(10) Patent No.: US 10,103,403 B2
(45) Date of Patent: Oct. 16, 2018

(54) METHOD OF MANUFACTURING SECONDARY BATTERY

(71) Applicant: Samsung SDI Co., Ltd., Yongin-si, Gyeonggi-do (KR)

(72) Inventor: Jaeil Seong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 45 days.

(21) Appl. No.: 15/332,669

(22) Filed: Oct. 24, 2016

(65) Prior Publication Data
US 2017/0125835 A1    May 4, 2017

(30) Foreign Application Priority Data

Nov. 4, 2015   (KR) .................. 10-2015-0154754

(51) Int. Cl.

| | |
|---|---|
| *B23K 20/00* | (2006.01) |
| *H01M 10/04* | (2006.01) |
| *B23K 20/10* | (2006.01) |
| *H01M 2/26* | (2006.01) |
| *H01M 2/22* | (2006.01) |

(52) U.S. Cl.
CPC ......... *H01M 10/0431* (2013.01); *B23K 20/10* (2013.01); *H01M 2/22* (2013.01); *H01M 2/263* (2013.01)

(58) Field of Classification Search
CPC .... B23K 20/10; B23K 2201/38; B23K 13/00; B23K 2201/36

USPC ............... 228/101, 1.1, 144, 623.1
See application file for complete search history.

(56) References Cited

U.S. PATENT DOCUMENTS

| | | | |
|---|---|---|---|
| 6,156,452 A | 12/2000 | Kozuki et al. | |
| 9,136,617 B2 | 9/2015 | Sakae | |
| 2010/0281681 A1* | 11/2010 | Rourke | H01M 2/206 29/623.1 |
| 2013/0048698 A1* | 2/2013 | Khakhalev | B23K 20/10 228/1.1 |

FOREIGN PATENT DOCUMENTS

| | | |
|---|---|---|
| KR | 2000-0068897 A | 11/2000 |
| KR | 10-2013-0080441 A | 7/2013 |
| KR | 10-2014-0110181 A | 9/2014 |

* cited by examiner

*Primary Examiner* — Erin B Saad
(74) *Attorney, Agent, or Firm* — Lewis Roca Rothgerber Christie LLP

(57) ABSTRACT

A method of manufacturing a secondary battery including an electrode assembly, a case configured to accommodate the electrode assembly, and an electrode terminal exposed from the case, wherein the method includes: welding a first electrode tab to a terminal plate by a first ultrasonic welding process, the first electrode tab extending from the electrode assembly, the terminal plate being electrically connected to the electrode terminal and accommodated in the case, and the first ultrasonic welding process including: arranging a pair of first fixing blocks on opposite sides of the terminal plate; pressing a horn against overlapping portions of the terminal plate and the first electrode tab exposed between the pair of first fixing blocks; and applying first ultrasonic vibrations from the horn.

14 Claims, 9 Drawing Sheets

METHOD OF MANUFACTURING SECONDARY BATTERY

CROSS-REFERENCE TO RELATED APPLICATION

This application claims priority to and the benefit of Korean Patent Application No. 10-2015-0154754, filed on Nov. 4, 2015, in the Korean Intellectual Property Office, the disclosure of which is incorporated herein in its entirety by reference.

BACKGROUND

1. Field

One or more exemplary embodiments relate to a method of manufacturing a secondary battery.

2. Description of the Related Art

Unlike primary batteries, secondary batteries are designed to be rechargeable. Secondary batteries may be used as energy sources of devices, such as mobile devices, electric vehicles, hybrid electric vehicles, electric bicycles, and/or uninterruptible power supplies. Single-cell secondary batteries or multi-cell secondary batteries (or secondary battery modules) in which a plurality of battery cells are electrically connected are used according to the types of external devices using the secondary batteries.

SUMMARY

One or more exemplary embodiments include a method of manufacturing a secondary battery having an improved aesthetic appearance with fewer errors.

Additional aspects will be set forth in part in the description which follows and, in part, will be apparent from the description, or may be learned by practice of the presented embodiments.

One or more exemplary embodiments include a method of manufacturing a secondary battery including an electrode assembly, a case configured to accommodate the electrode assembly, and an electrode terminal exposed from the case. According to one or more embodiments, the method includes: welding a first electrode tab to a terminal plate by a first ultrasonic welding process, the first electrode tab extending from the electrode assembly, the terminal plate being electrically connected to the electrode terminal and accommodated in the case, and the first ultrasonic welding process includes: arranging a pair of first fixing blocks on opposite sides of the terminal plate, pressing a horn against overlapping portions of the terminal plate and the first electrode tab exposed between the pair of first fixing blocks, and applying first ultrasonic vibrations from the horn.

The first ultrasonic vibrations may be applied in a direction parallel with a direction in which the pair of first fixing blocks face each other.

The pair of first fixing blocks may be arranged along first sides of the terminal plate, and the first ultrasonic vibrations may be applied in a direction parallel with second sides of the terminal plate. The first sides may be longer than the second sides.

In the first ultrasonic welding process, the terminal plate and the first electrode tab may be coupled to each other in an overlapping manner on the same plane, and the method may further include bending the first electrode tab after performing the first ultrasonic welding process such that the first electrode tab bends from the terminal plate.

The pair of first fixing blocks may have smooth surfaces facing the terminal plate.

The method may further include welding a second electrode tab extending from the electrode assembly to a cap plate by a second ultrasonic welding process, and the second ultrasonic welding process may include arranging a pair of second fixing blocks on opposite sides of the cap plate, pressing a horn against overlapping portions of the cap plate and the second electrode tab exposed between the pair of second fixing blocks, and applying second ultrasonic vibrations from the horn.

The second ultrasonic vibrations may be applied in a direction parallel with a direction in which the pair of second fixing blocks face each other.

The pair of second fixing blocks may be arranged along first sides of the cap plate, and the second ultrasonic vibrations may be applied in a direction parallel with second sides of the cap plate. The first sides may be longer than the second sides.

In the second ultrasonic welding process, the cap plate and the second electrode tab may be coupled to each other in an overlapping manner on the same plane, and the method may further include bending the second electrode tab after performing the second ultrasonic welding process such that the second electrode tab bends from the cap plate.

The pair of second fixing blocks may have smooth surfaces facing the cap plate.

The case may include: a can configured to accommodate the electrode assembly; and the cap plate configured to close an opening of the can. The method may further include welding the cap plate and the can after performing the first and second ultrasonic welding processes by performing a third ultrasonic welding process. The third ultrasonic welding process may include: arranging the cap plate on the can and ultrasonically welding the cap plate and the can along edges of the cap plate and the can.

The third ultrasonic welding process may include arranging a pair of third fixing blocks on opposite sides of the can, pressing a horn against overlapping portions of the can and the cap plate exposed between the pair of third fixing blocks, and applying third ultrasonic vibrations from the horn.

The pair of third fixing blocks may be arranged along first sides of the can, and the third ultrasonic vibrations may be applied in a direction parallel with second sides of the can. The first sides may be longer than the second sides.

One of the can and the cap plate may include a stopping structure configured to fix the other of the can and the cap plate, and in the third ultrasonic welding process, a weld zone may be formed along edges of the other of the can and the cap plate placed on the stopping structure.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
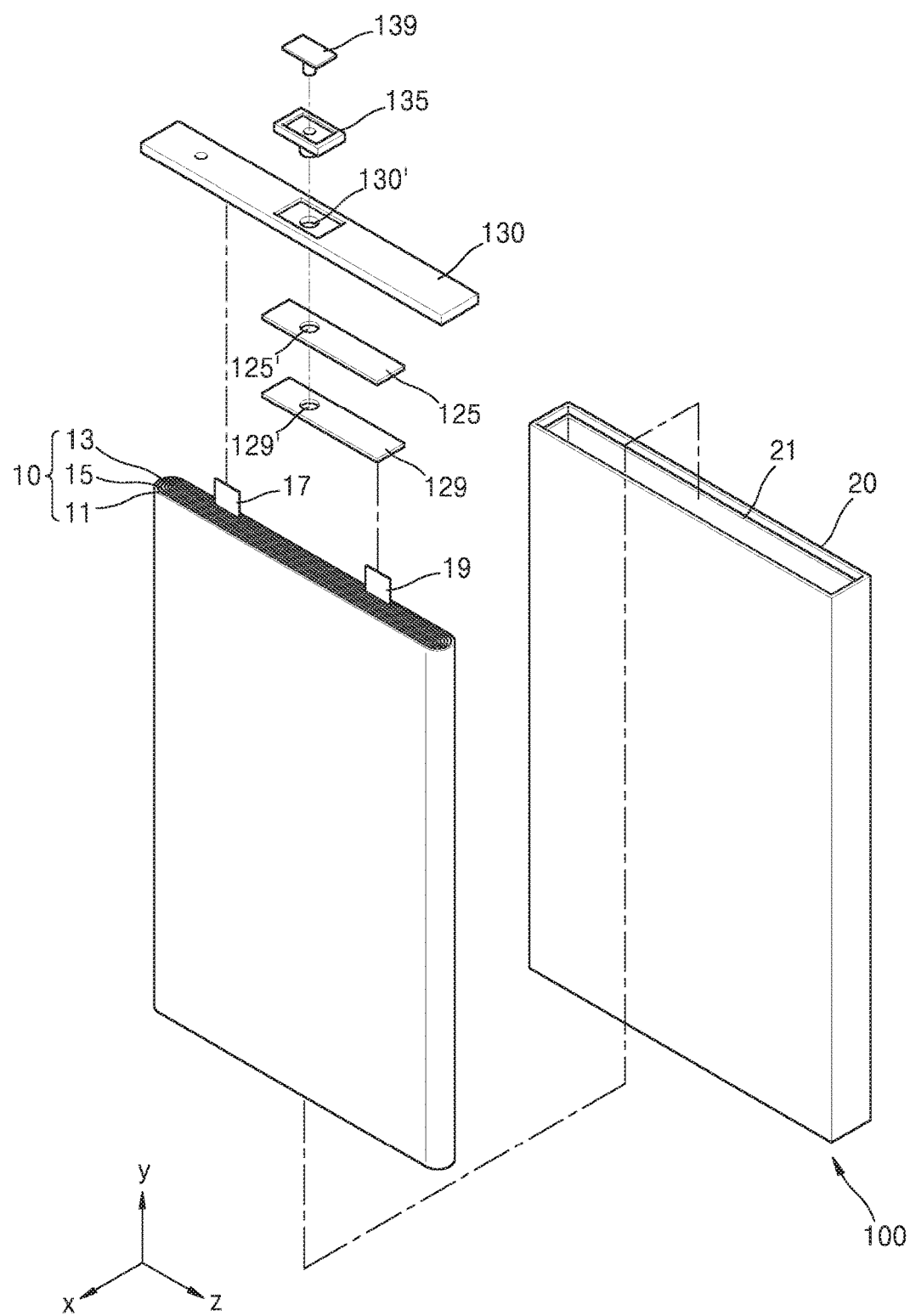
FIG. 1 is an exploded perspective view illustrating a secondary battery manufactured according to an exemplary embodiment.

Reference is made herein in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Accordingly, the exemplary embodiments are merely described below, by referring to the figures, to explain aspects of the present description. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the terms "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." In addition, the use of alternative language, such as "or," when describing embodiments of the present invention, refers to "one or more embodiments of the present invention" for each corresponding item listed. As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, a method of manufacturing a secondary battery according to one or more exemplary embodiments is described with reference to the accompanying drawings, in which exemplary embodiments are shown.

Figure 2:
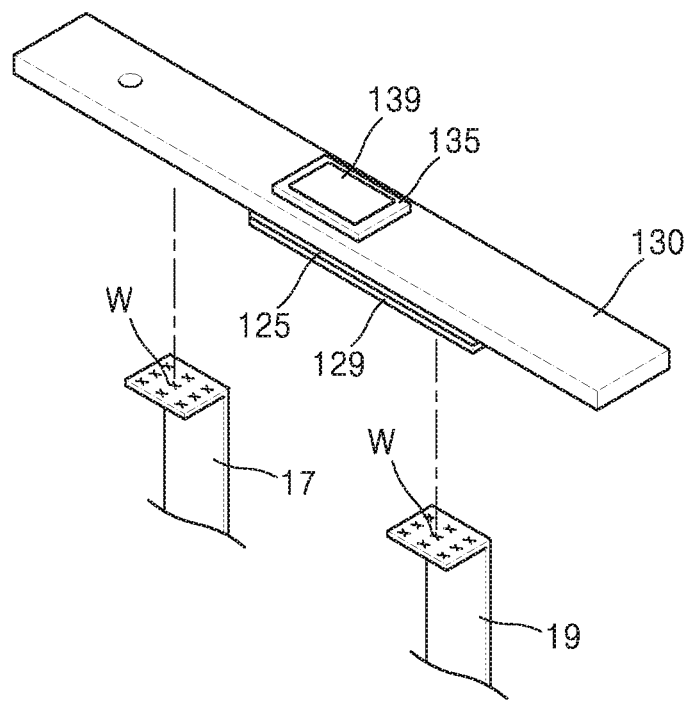
FIGS. 2-3 are schematic views illustrating weld zones for first and second ultrasonic welding processes according to an exemplary embodiment.
Figure 3:
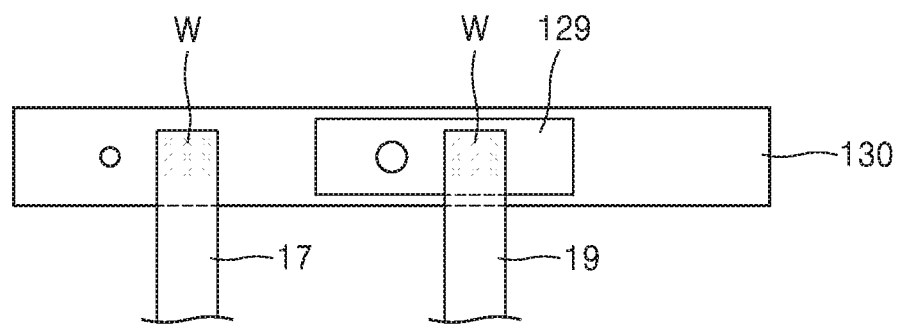
Figure 4:
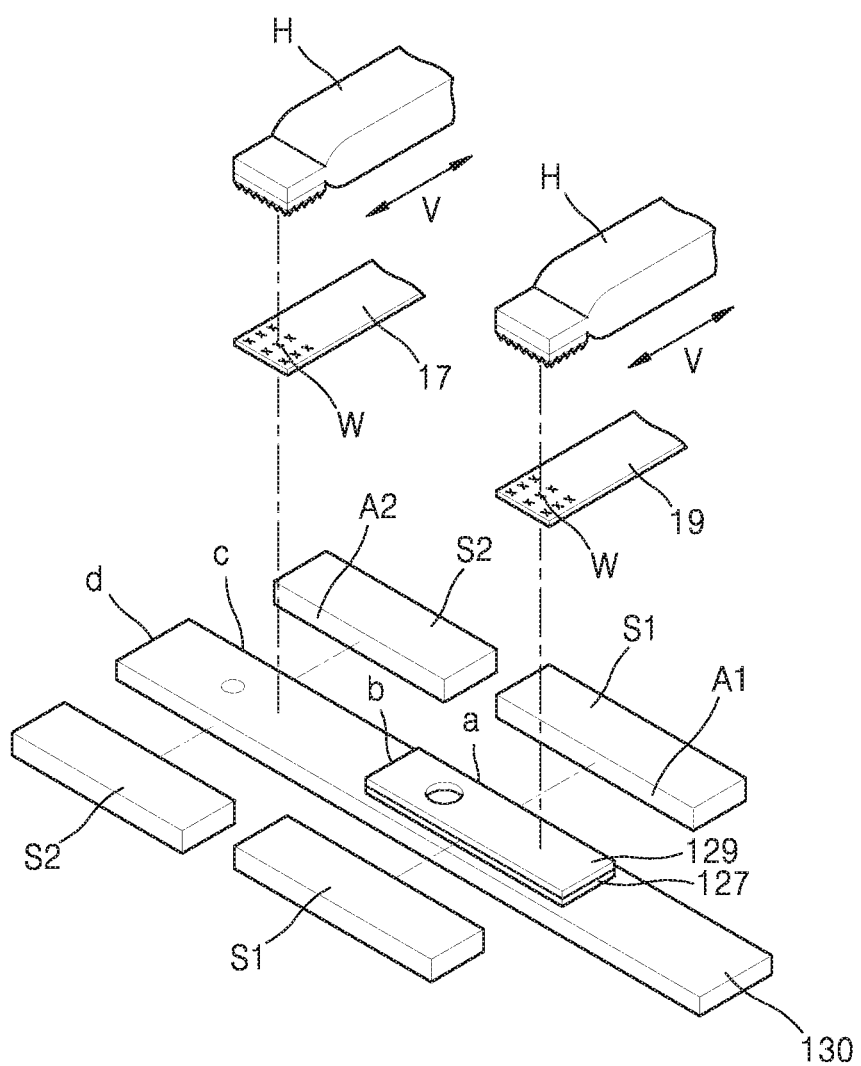
FIG. 4 is a perspective view illustrating first and second ultrasonic welding processes according to an exemplary embodiment.
Figure 5:
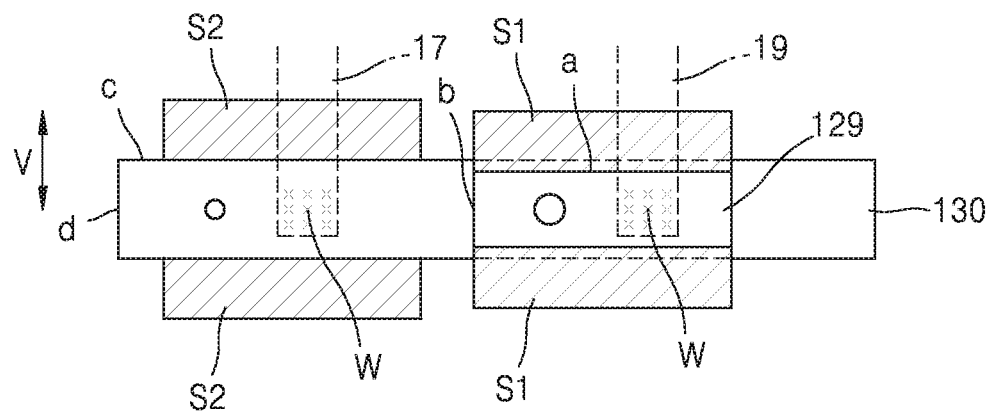
FIGS. 5-6 are schematic views illustrating first and second fixing blocks that may be used in the first and second ultrasonic welding processes according to an exemplary embodiment.
Figure 6:
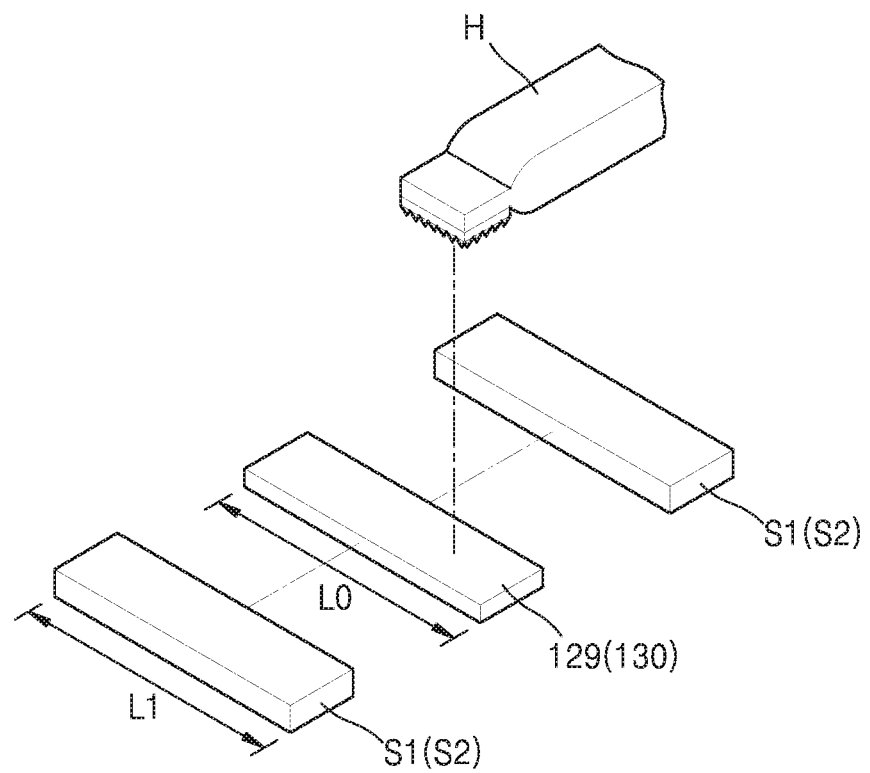

FIG. 1 is an exploded perspective view illustrating a secondary battery manufactured according to an exemplary embodiment. FIGS. 2 and 3 are schematic views illustrating weld zones W for first and second ultrasonic welding processes. FIG. 4 is a perspective view illustrating first and second ultrasonic welding processes. FIGS. 5 and 6 are schematic views illustrating first and second fixing blocks S1 and S2 that may be used in the first and second ultrasonic welding processes.

Referring to FIGS. 1 to 6, the secondary battery may include an electrode assembly 10 from which a first electrode tab 19 and a second electrode tab 17 extend, a case 100 configured to accommodate the electrode assembly 10, an electrode terminal 139 exposed to the outside of the case 100, and a terminal plate 129 electrically connected to the electrode terminal 139 and disposed inside the case 100.

The electrode assembly 10 may include a first electrode plate 13, a second electrode plate 11, and a separator 15. For example, the electrode assembly 10 may be formed by winding a stack of the first electrode plate 13, the second electrode plate 11, and the separator 15 in the shape of a jelly roll. The electrode assembly 10 may be disposed in the case 100 together with an electrolyte.

The first electrode tab 19 and the second electrode tab 17 may be connected to at least portions of the first electrode plate 13 and the second electrode plate 11. For example, the first electrode tab 19 may be connected to the electrode terminal 139 protruding from an upper surface of a cap plate 130, and the second electrode tab 17 may be connected to the cap plate 130.

The electrode terminal 139 may be coupled to the cap plate 130 and insulated from the cap plate 130. The electrode terminal 139 may protrude from the upper surface of the cap plate 130. For example, an insulation gasket 135 may be disposed between the electrode terminal 139 and the cap plate 130.

The case 100 may include a can 20 having an opened upper end (or an upper opening) to receive the electrode assembly 10 and the electrolyte, and the cap plate 130, which closes the upper opening of the can 20. Contact portions of the cap plate 130 and the can 20 may be hermetically joined by an ultrasonic welding method.

The terminal plate 129 may be disposed between the first electrode tab 19 and the electrode terminal 139. For example, a side of the terminal plate 129 may be coupled to the first electrode tab 19, and a terminal opening (or a terminal hole) 129' may be formed in another side of the terminal plate 129 to receive the electrode terminal 139. An insulation plate 125 may be disposed between the terminal plate 129 and the cap plate 130 to insulate the terminal plate 129 and the cap plate 130 from each other.

When assembled, the electrode terminal 139 may penetrate the cap plate 130 with the insulation gasket 135 being disposed therebetween. For example, the electrode terminal 139 may be inserted through terminal openings (or terminal holes) 130', 125', and 129' of the cap plate 130, the insulation plate 125, and the terminal plate 129, respectively. For example, in an assembled state, the electrode terminal 139 may sequentially penetrate the cap plate 130, the insulation plate 125, and the terminal plate 129 in a direction from an upper side to a lower side of the cap plate 130.

In the exemplary embodiment, the terminal plate 129 and the first electrode tab 19 may be coupled to each other through a first ultrasonic welding process. For example, a weld zone W may be formed between the terminal plate 129 and the first electrode tab 19. Ultrasonic welding is a method of welding two workpieces by applying high-frequency vibrations to the two workpieces to press the two workpieces and generate heat by vibration friction between the workpieces. However, in the case of a fusing-type welding method in which a high current is applied to workpieces to form a molten pool between the workpieces, spatters may often (or typically) be formed, thereby spoiling (or negatively impacting) the appearance of welded parts and leading to defects such as a short circuit. In the exemplary embodiment, an ultrasonic welding method that prevents or reduces the formation of spatters is used, thereby improving the aesthetic appearance of products and minimizing or reducing defects.

Referring to FIG. 4, in the first ultrasonic welding process, a horn H having a concave-convex surface is prepared, along with the first fixing blocks S1 for fixing workpieces (e.g., the terminal plate 129 and the first electrode tab 19) to weld the workpieces together. The workpieces are placed (or arranged) among the horn H and the first fixing blocks S1 in an overlapping manner. Then, ultrasonic vibrations are applied from the horn H to the terminal plate 129 and the first electrode tab 19.

According to the exemplary embodiment, ultrasonic welding may be performed after fixing the terminal plate 129 using the first fixing blocks S1 and pressing the horn H against the first electrode tab 19 (or against the weld zone W between the first electrode tab 19 and the terminal plate 129). The first fixing blocks S1 may include a pair of first fixing blocks S1 facing each other with a gap therebetween for fixing opposite sides of the terminal plate 129. After fixing the terminal plate 129 between the pair of first fixing blocks S1, ultrasonic welding may be performed.

The pair of first fixing blocks S1 may face each other, and the terminal plate 129 may be fixed between the pair of first fixing blocks S1. In the exemplary embodiment, the pair of first fixing blocks S1 may be arranged in parallel with long sides (e.g., relatively long sides) (a) of the terminal plate 129.

For example, the terminal plate 129 may have an approximately (or substantially) rectangular shape with a pair of first sides (or long sides) (a) and a pair of second sides (or short sides) (b). The pair of first fixing blocks S1 may fix (e.g., securely fix) the terminal plate 129 while contacting the long sides (a) of the terminal plate 129, (e.g., relatively long edges of the terminal plate 129). For example, the pair of first fixing blocks S1 may face each other with the long sides (a) of the terminal plate 129 being disposed therebetween. The first fixing blocks S1 may have any suitable height such that the contact area between the first fixing blocks S1 and the terminal plate 129 is sufficient to fix (or securely fix) the terminal plate 129.

In the first ultrasonic welding process, a direction of vibration V may be set to be parallel (or substantially parallel) with the short sides (b) of the terminal plate 129. In the first ultrasonic welding process, high-frequency ultrasonic vibrations are applied to the first electrode tab 19 (or the weld zone W between the first electrode tab 19 and the terminal plate 129), and despite these ultrasonic vibrations, fixation between the first electrode tab 19 and the terminal plate 129 may be maintained (e.g., maintained without wobbling). For example, if the fixation between the first electrode tab 19 and the terminal plate 129 becomes unstable and loose, pressure and heat may not be intensively applied to the weld zone W. For example, during ultrasonic welding, the weld zone W having a relatively small area is intensively pressed by the horn H and heated by vibration friction. However, when the position of the weld zone W varies under the influence of ultrasonic vibrations, the weld zone W (e.g., the weld zone W in its entirety) may not be intensively pressed and heated, and thus the weldability of the weld zone W may be reduced. As such, in the first ultrasonic welding process, the direction of vibration V may be set to be parallel with the short sides (b) of the terminal plate 129 so as to block (or prevent or reduce) the movement of the terminal plate 129 using the first fixing blocks S1.

The first fixing blocks S1 may be brought into contact with the long sides (a) of the terminal plate 129, and thus the contact area between the first fixing blocks S1 and the terminal plate 129 may be relatively large. For example, the terminal plate 129 may be stably (or substantially stably) supported against ultrasonic vibrations applied in the direction of the short sides (b) of the terminal plate 129, and thus the direction of vibration V may be set to be parallel with the short sides (b) of the terminal plate 129.

According to the exemplary embodiment, the cap plate 130 and the second electrode tab 17 may be coupled to each other through a second ultrasonic welding process. For example, an ultrasonic weld zone W may be formed between the cap plate 130 and the second electrode tab 17. For example, according to the exemplary embodiment, the first ultrasonic welding process for welding the terminal plate 129 and the first electrode tab 19 to each other and the second ultrasonic welding process for welding the cap plate 130 and the second electrode tab 17 to each other may be performed simultaneously (or concurrently), or may be performed at different times.

Referring to FIG. 4, in the second ultrasonic welding process, a horn H having a concave-convex surface is prepared, along with the second fixing blocks S2 for fixing workpieces (e.g., the cap plate 130 and the second electrode tab 17) to weld the workpieces together. The workpieces are placed (or arranged) among the horn H and the second fixing blocks S2 in an overlapping manner. Then, ultrasonic vibrations are applied to the cap plate 130 and the second electrode tab 17. According to the exemplary embodiment, ultrasonic welding may be performed after fixing the cap plate 130 using the second fixing blocks S2 and pressing the horn H against the second electrode tab 17 (or against the weld zone W between the second electrode tab 17 and the cap plate 130). The second fixing blocks S2 may include a pair of second fixing blocks S2 facing each other with a gap therebetween for fixing opposite sides of the cap plate 130. After fixing the cap plate 130 between the pair of second fixing blocks S2, ultrasonic welding may be performed.

The pair of second fixing blocks S2 may face each other, and the cap plate 130 may be fixed between the pair of second fixing blocks S2. In the exemplary embodiment, the pair of second fixing blocks S2 may be arranged in parallel with long sides (e.g., relatively long sides) (c) of the cap plate 130.

For example, the cap plate 130 may have an approximately (or substantially) rectangular shape with a pair of first sides (or long sides) (c) and a pair of second sides (or short sides) (d). The pair of second fixing blocks S2 may fix (e.g., securely fix) the cap plate 130 while contacting the long sides (c) of the cap plate 130, (e.g., relatively long edges of the cap plate 130). For example, the pair of second fixing blocks S2 may face each other with the long sides (c) of the cap plate 130 being disposed therebetween. The second fixing blocks S2 may have any suitable height such that the contact area between the second fixing blocks S2 and the cap plate 130 may be sufficient to fix (or securely fix) the cap plate 130.

In the second ultrasonic welding process, the direction of vibration V may be set to be parallel (or substantially parallel) with the short sides (d) of the cap plate 130. In the second ultrasonic welding process, high-frequency ultrasonic vibrations are applied to the second electrode tab 17 (or the weld zone W between the second electrode tab 17 and the cap plate 130), and despite these ultrasonic vibrations, fixation between the second electrode tab 17 and the cap plate 130 may be maintained (e.g., maintained without wobbling).

The second fixing blocks S2 may be brought into contact with the long sides (c) of the cap plate 130, and thus the contact area between the second fixing blocks S2 and the cap plate 130 may be relatively large. For example, the cap plate 130 may be stably (or substantially stably) supported against ultrasonic vibrations applied in the direction of the short sides (d) of the cap plate 130, and thus the direction of vibration V may be set to be parallel with the short sides (d) of the cap plate 130.

Referring to FIG. 4, the first fixing blocks S1 have smooth (or substantially smooth) surfaces that face an object to be fixed. For example, first surfaces A1 of the first fixing blocks S1 facing the terminal plate 129 are smooth (or substantially smooth). Similarly, the second fixing blocks S2 have smooth (or substantially smooth) surfaces facing an object to be fixed. For example, second surfaces A2 of the second fixing blocks S2 facing the cap plate 130 are smooth (or substantially smooth). As described above, because the first and second surfaces A1 and A2 of the first and second fixing blocks S1 and S2, respectively, are smooth, weld defects may be prevented or reduced on lateral surfaces of the terminal plate 129 or the cap plate 130 fixed by the first fixing blocks S1 or the second fixing blocks S2, respectively.

Referring to FIG. 6, the first fixing blocks S1 may have a sufficient length L1 as compared to the length L0 of the terminal plate 129 to be fixed by the first fixing blocks S1. For example, the length L1 of the first fixing blocks S1 may be 60% or more of the length L0 of the terminal plate 129. Similarly, the second fixing blocks S1 may have a sufficient length L1 as compared to the length L0 of the cap plate 130 to be fixed by the second fixing blocks S2. For example, the length L1 of the second fixing blocks S2 may be 60% or more of the length L0 of the cap plate 130.

Figure 7:
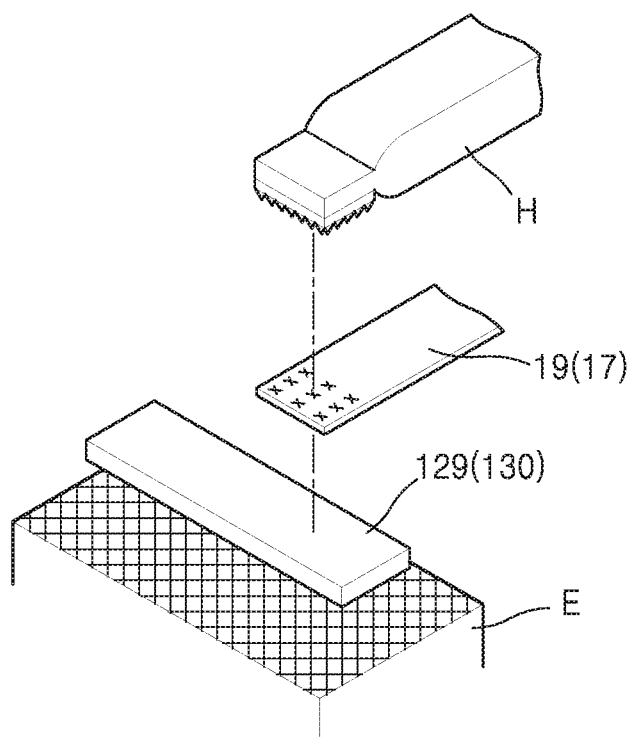
FIG. 7 is a perspective view illustrating an ultrasonic welding process according to a comparative example for comparison with an exemplary embodiment of the inventive concept.
Figure 8:
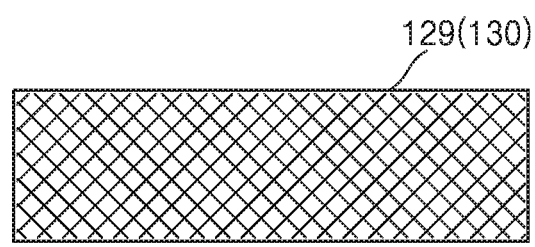
FIG. 8 is a top view illustrating a workpiece processed through the ultrasonic welding process illustrated in FIG. 7.

FIG. 7 is a perspective view illustrating an ultrasonic welding process according to a comparative example for comparison with embodiments of the inventive concept. FIG. 8 is a top view illustrating a workpiece processed through the ultrasonic welding process illustrated in FIG. 7.

Referring to FIGS. 7 and 8, the terminal plate 129 and the first electrode tab 19 (or the cap plate 130 and the second electrode tab 17) are placed as workpieces between a horn H and an anvil E, and ultrasonic vibrations are applied from the horn H. In this case, the terminal plate 129 (or the cap plate 130) is patterned according to a concave-convex pattern of the anvil E. The pattern that remains after the ultrasonic welding may spoil the appearance of the secondary battery and may lead to errors.

However, as shown in FIG. 4, according to the exemplary embodiment, because the terminal plate 129 (or the cap plate 130) is fixed between the first fixing blocks S1 having smooth first surfaces A1 (or the second fixing blocks S2 having smooth second surfaces A2), marks or patterns may be prevented or reduced from forming on the terminal plate 129 (or the cap plate 130) after ultrasonic welding. Thus, the aesthetic appearance of the secondary battery may be improved, and errors caused by damaged parts may be reduced or minimized.

In addition, the first and second fixing blocks S1 and S2 may include a resin. When the first and second fixing blocks S1 and S2 include a resin, it may be easy to form the first and second fixing blocks S1 and S2 to have smooth first and second surfaces A1 and A2, and thus defects such as contact scratches may be reduced or prevented from forming on the terminal plate 129 or the cap plate 130 after welding.

Figure 9:
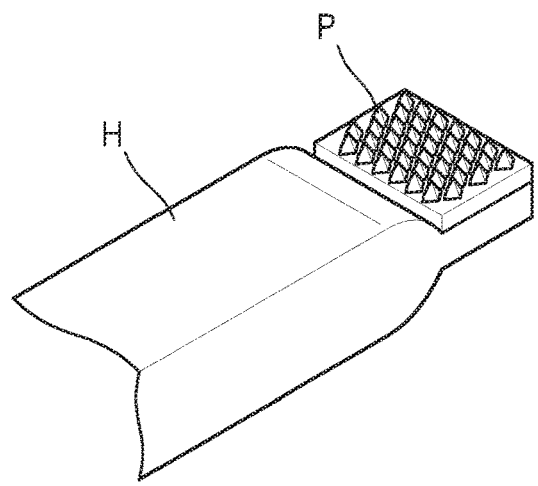
FIG. 9 is a perspective view illustrating a horn that may be used for ultrasonic welding according to an exemplary embodiment.

FIG. 9 is a perspective view illustrating the horn H that may be used for ultrasonic welding according to an exemplary embodiment.

Referring to FIG. 9, the horn H may have a concave-convex surface on which protrusions P are arranged (e.g., regularly arranged). For example, the protrusions P may have a quadrangular pyramid shape having a quadrangular bottom and may be arranged in a matrix form to form the concave-convex surface.

Figure 10:
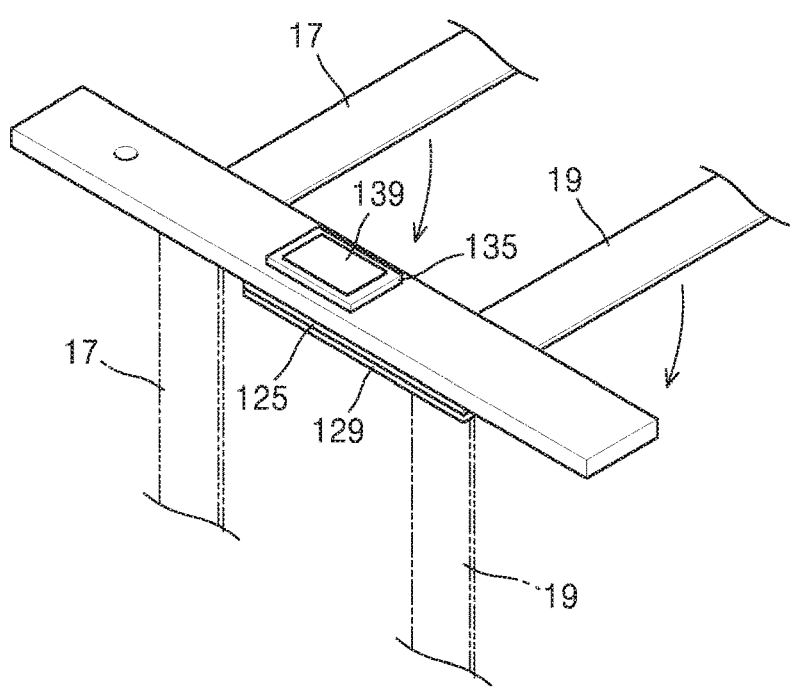
FIG. 10 is a perspective view illustrating bending of electrode tabs after the first and second ultrasonic welding processes according to an exemplary embodiment.

FIG. 10 is a perspective view illustrating bending of the first and second electrode tabs 19 and 17 after the first and second ultrasonic welding processes.

Referring to FIG. 10, after the first ultrasonic welding process in which the terminal plate 129 and the first electrode tab 19 are coupled to each other in an overlapping manner on the same plane, the first electrode tab 19 is bent such that the first electrode tab 19 may stand on (or bend from or bend away from) the terminal plate 129 (first bending). Thus, the electrode assembly 10 from which the first electrode tab 19 extends may be placed under the terminal plate 129.

Similarly, after the second ultrasonic welding process in which the cap plate 130 and the second electrode tab 17 are coupled to each other in an overlapping manner on the same plane, the second electrode tab 17 is bent such that the second electrode tab 17 may stand on (or bend from or bend away from) the cap plate 130 (second bending). Thus, the electrode assembly 10 from which the second electrode tab 17 extends may be placed under the cap plate 130.

The first bending and the second bending may be performed at the same time (or concurrently) such that the electrode assembly 10 from which the first and second electrode tabs 19 and 17 extend may be placed under the cap plate 130. Then, the electrode assembly 10 may be inserted into the can 20, and the cap plate 130 may seal the upper opening of the can 20.

Figure 11:
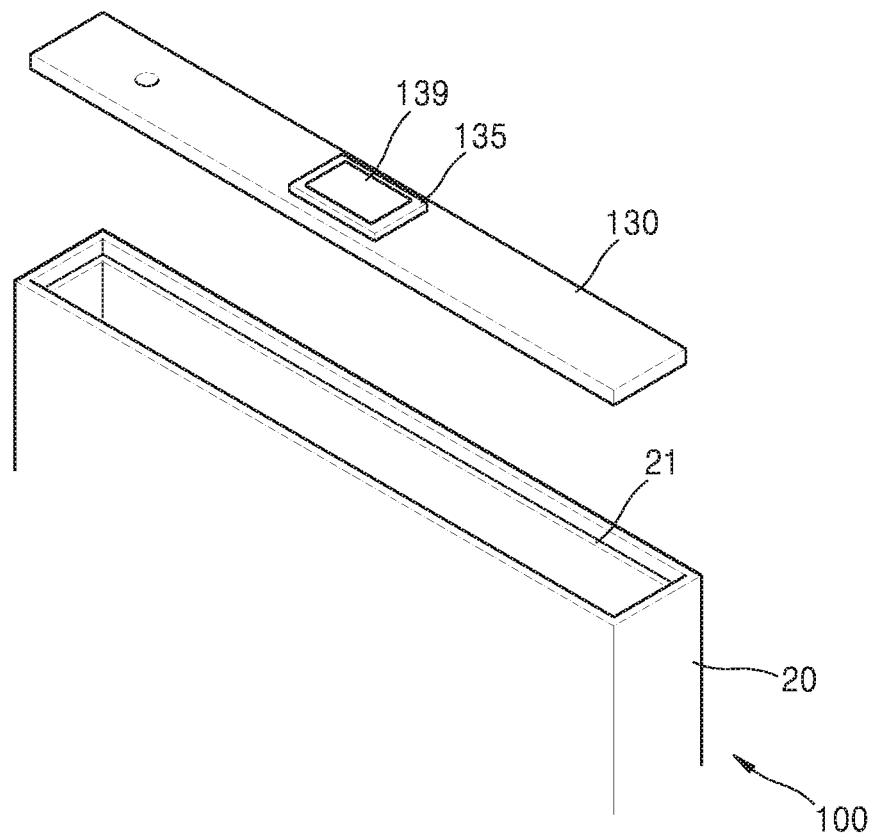
FIG. 11 is a perspective view illustrating an assembly structure between a can and a cap plate according to an exemplary embodiment.
Figure 12:
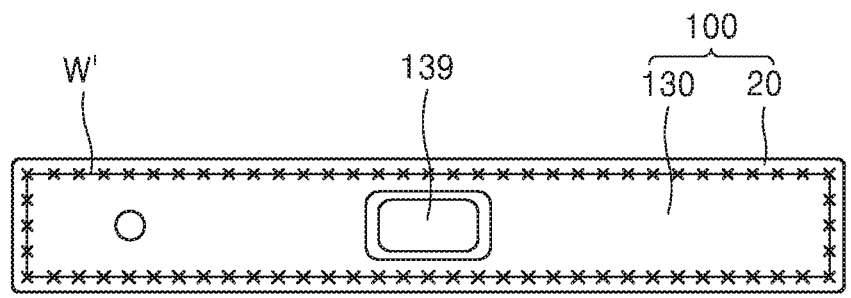
FIG. 12 is a top view illustrating a weld zone between the can and the cap plate according to an exemplary embodiment.
Figure 13:
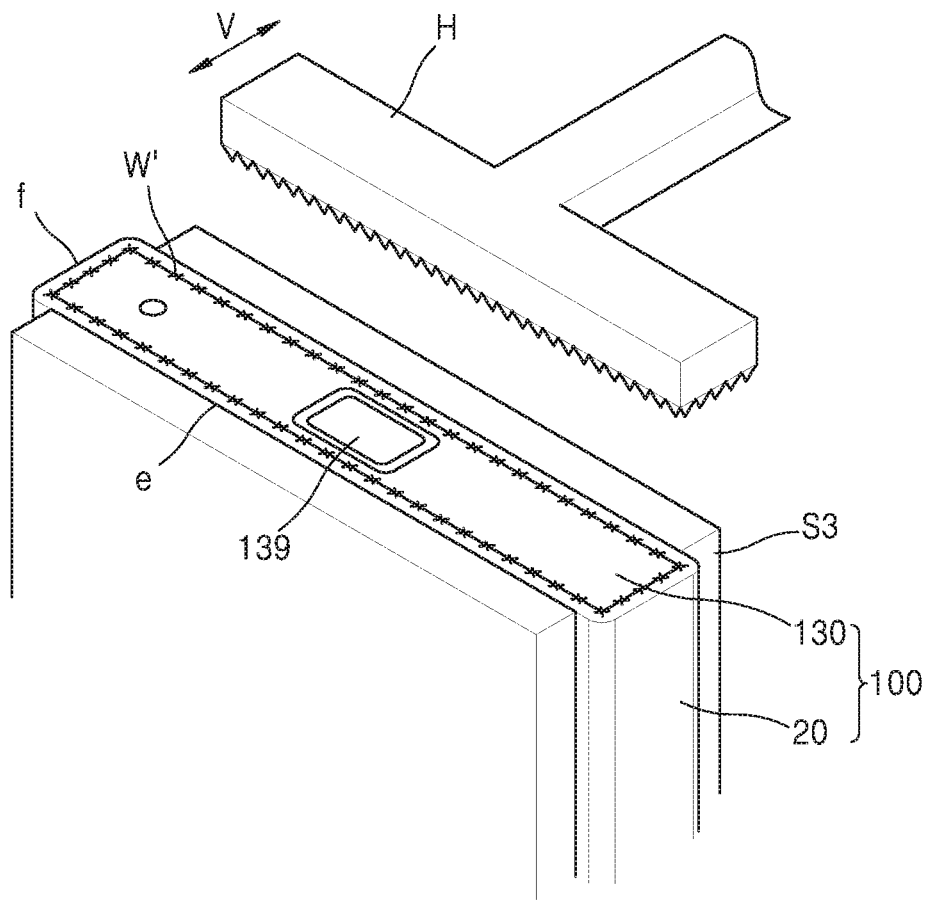
FIG. 13 is a perspective view illustrating a third ultrasonic welding process according to an exemplary embodiment.

FIG. 11 is a perspective view illustrating an assembly structure between the can 20 and the cap plate 130. FIG. 12 is a top view illustrating a weld zone W' between the can 20 and the cap plate 130. FIG. 13 is a perspective view illustrating a third ultrasonic welding process.

Referring to FIG. 11, the secondary battery may include the can 20 accommodating the electrode assembly 10 and the cap plate 130 sealing the upper opening of the can 20. According to the exemplary embodiment, after the first and second ultrasonic welding processes are performed, the cap plate 130 may be placed on the can 20, and a third ultrasonic welding process may be performed along edges of the can 20 and the cap plate 130.

According to the exemplary embodiment, the cap plate 130 may be placed on a stopping structure 21 of the can 20. Thereafter, the cap plate 130 and the can 20 may be ultrasonic-welded along the edges of the cap plate 130. That is, the cap plate 130 and the can 20 may be coupled to each other along the weld zone W'.

Referring to FIGS. 11 to 13, in the third ultrasonic welding process, a horn H having a concave-convex surface is prepared along with third fixing blocks S3 for fixing workpieces (e.g., the cap plate 130 and the can 20). The workpieces are placed (or arranged) among the horn H and the third fixing blocks S3. Then, ultrasonic vibrations are applied from the horn H to the cap plate 130 and the can 20.

According to the exemplary embodiment, ultrasonic welding may be performed after fixing the can 20 using the third fixing blocks S3 and pressing the horn H against the cap plate 130 (or against the weld zone W' between the cap plate 130 and the can 20). The third fixing blocks S3 may include a pair of third fixing blocks S3 facing each other with a gap therebetween for fixing opposite sides of the can 20. After fixing the can 20 between the pair of third fixing blocks S3, ultrasonic welding may be performed.

The pair of third fixing blocks S3 may face each other, and the can 20 may be fixed between the pair of third fixing blocks S3. In the exemplary embodiment, the pair of third fixing blocks S3 may be arranged in parallel with relatively long sides (e) of the can 20.

For example, the can 20 may have an approximately rectangular shape with a pair of first sides (or long sides) (e) and a pair of second sides (or short sides) (f). For example, the pair of third fixing blocks S3 may fix (e.g., securely fix) the can 20 while contacting the long sides (e) of the can 20, e.g., relatively long edges of the can 20. For example, the pair of third fixing blocks S3 may face each other with the long sides (e) of the can 20 being disposed therebetween. The third fixing blocks S3 may have any suitable height such that the contact area between the third fixing blocks S3 and the can 20 may be sufficient to fix (or securely fix) the can 20.

In the third ultrasonic welding process, the direction of vibration V may be set to be parallel with the short sides (f) of the can 20. In the third ultrasonic welding process, high-frequency ultrasonic vibrations are applied to the cap plate 130 (or the weld zone W' between the cap plate 130 and the can 20), and despite these ultrasonic vibrations, fixation between the cap plate 130 and the can 20 may be maintained (e.g., maintained without wobbling).

The third fixing blocks S3 may be brought into contact with the long sides (e) of the can, and thus the contact area between the third fixing blocks S3 and the can 20 may be relatively large. For example, the can 20 may be stably supported against ultrasonic vibrations applied in the direction of the short sides (f) of the can 20, and thus the direction of vibration V may be set to be parallel with the short sides (f) of the can 20.

Figure 14:
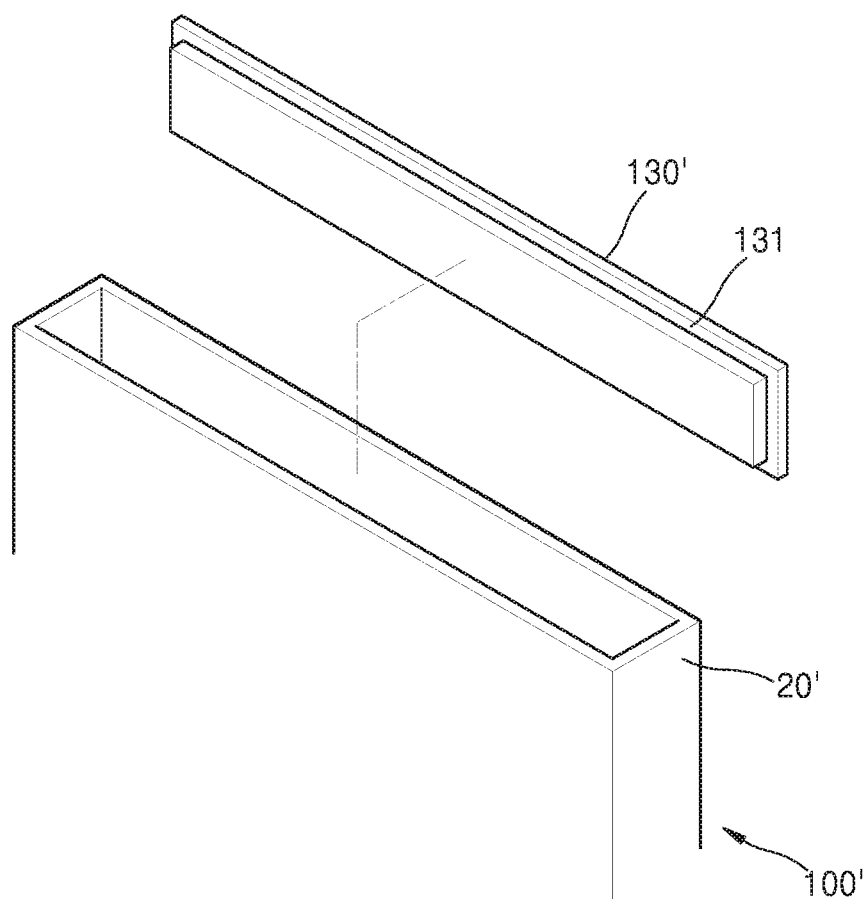
FIG. 14 is a perspective view illustrating an assembly structure between a can and a cap plate according to another exemplary embodiment.

FIG. 14 is a perspective view illustrating an assembly structure between a can 20' and a cap plate 130' according to another exemplary embodiment.

Referring to FIG. 14, a case 100' of a secondary battery may include the can 20' accommodating an electrode assembly and the cap plate 130' sealing an upper opening of the can 20'. In the current exemplary embodiment, the cap plate 130' may include a stopping structure 131, and the stopping structure 131 may be supported on an upper surface of the can 20'. In the exemplary embodiment shown in FIG. 11, the cap plate 130 is placed on the stopping structure 21 of the can 20. However, in the exemplary embodiment shown in FIG. 14, the stopping structure 131 of the cap plate 130' is placed on the can 20'. Thereafter, the cap plate 130' and the can 20' may be ultrasonic-welded along edges of the cap plate 130'.

Hereinafter, a method of manufacturing a secondary battery is described according to an exemplary embodiment.

Referring to FIG. 1, the electrode assembly 10 from which the first electrode tab 19 extends is prepared. Then, the case 100 that accommodates the electrode assembly 10 is prepared. The electrode terminal 139 is prepared and exposed to the outside of the case 100. The terminal plate 129 is electrically connected to the electrode terminal 139 and disposed in the case 100. The case 100 may include the can 20 accommodating the electrode assembly 10 and the cap plate 130 closing the upper opening of the can 20.

When assembled, the electrode terminal 139 may penetrate the cap plate 130 with the insulation gasket 135 being disposed therebetween. For example, the electrode terminal 139 may be inserted through the terminal holes 130', 125', and 129' respectively formed in the cap plate 130, the insulation plate 125, and the terminal plate 129. For example, the electrode terminal 139 may be coupled in such a manner that the electrode terminal 139 may sequentially penetrate the cap plate 130, the insulation plate 125, and the terminal plate 129 in a direction from the upper side to the lower side of the cap plate 130.

Next, as shown in FIG. 4, the first electrode tab 19 and the terminal plate 129 are coupled together through a first ultrasonic welding process by placing the pair of first fixing blocks S1 on opposite sides of the terminal plate 129, pressing the horn H against overlapping portions of the terminal plate 129 and the first electrode tab 19 exposed between the pair of first fixing blocks S1, and applying first ultrasonic vibrations from the horn H.

In the first ultrasonic welding process, the pair of first fixing blocks S1 may be arranged along the long sides (a) of the terminal plate 129, and the direction of vibration V may be set to be parallel with the short sides (b) of the terminal plate 129. The first fixing blocks S1 may be brought into contact with the long sides (a) of the terminal plate 129, and thus the contact area between the first fixing blocks S1 and the terminal plate 129 may be relatively large. For example, the terminal plate 129 may be stably supported against ultrasonic vibrations applied in the direction of the short sides (b) of the terminal plate 129, and thus the direction of vibration V may be set to be parallel with the short sides (b) of the terminal plate 129. That is, in the first ultrasonic welding process, the direction of vibration V may be set to be parallel with a direction in which the pair of first fixing blocks S1 face each other. For example, the pair of first fixing blocks S1 may be arranged along the long sides (a) of the terminal plate 129 and may face each other in a direction parallel with the short sides (b) of the terminal plate 129.

In the method of manufacturing a secondary battery according to the exemplary embodiment, the second electrode tab 17 extending from the electrode assembly 10 may be coupled to the cap plate 130 through a second ultrasonic welding process by placing the pair of second fixing blocks S2 on opposite sides of the cap plate 30, pressing the horn H against overlapping portions of the cap plate 130 and the second electrode tab 17 exposed between the pair of second fixing blocks S2, and applying ultrasonic vibrations from the horn H.

Referring to FIG. 4, in the second ultrasonic welding process, the direction of vibration V may be set to be parallel with a direction in which the pair of second fixing blocks S2 face each other. For example, the pair of second fixing blocks S2 may be arranged along the long sides (c) of the cap plate 130 and may face each other in a direction parallel with the short sides (d) of the cap plate 130. In the second ultrasonic welding process, the direction of vibration V may be set to be parallel with the short sides (d) of the cap plate 130.

The first fixing blocks S1 have smooth (or substantially smooth) first surfaces A1, and the first surfaces A1 face the terminal plate 129 when the terminal plate 129 is fixed by the first fixing blocks S1. Similarly, the second fixing blocks S2 have smooth (or substantially smooth) second surfaces A2, and the second surfaces A2 face the cap plate 130 when the cap plate 130 is fixed by the second fixing blocks S2. As described above, because the first and second surfaces A1 and A2 of the first and second fixing blocks S1 and S2 are smooth (or substantially smooth), weld defects may be prevented or reduced on lateral surfaces of the terminal plate 129 or the cap plate 130 fixed by the first fixing blocks S1 or the second fixing blocks S2.

According to the exemplary embodiment, because the terminal plate 129 (or the cap plate 130) is fixed between the first fixing blocks S1 having smooth first surfaces A1 (or the second fixing blocks S2 having smooth second surfaces A2), marks or patterns may not remain on the terminal plate 129 or the cap plate 130 after ultrasonic welding. Thus, the aesthetic appearance of the secondary battery may be improved, and errors caused by damaged parts may be reduced or minimized.

Referring to FIG. 10, after the terminal plate 129 and the first electrode tab 19 are coupled to each other in an overlapping manner on the same plane by the first ultrasonic welding process, the first electrode tab 19 is bent such that the first electrode tab 19 may stand on (or bends from or bends away from) the terminal plate 129 (first bending).

Similarly, after the cap plate 130 and the second electrode tab 17 are coupled to each other in an overlapping manner on the same plane by the second ultrasonic welding process, the second electrode tab 17 is bent such that the second electrode tab 17 may stand on (or bends from or bends away from) the cap plate 130 (second bending).

The first bending and the second bending may be performed at the same time such that the electrode assembly 10 from which the first and second electrode tabs 19 and 17 extend may be placed under the cap plate 130. Then, the electrode assembly 10 may be inserted into the can 20, and the cap plate 130 may close the upper opening of the can 20.

Referring to FIG. 11, the secondary battery may include the can 20 accommodating the electrode assembly 10 and the cap plate 130 closing the upper opening of the can 20. According to the exemplary embodiment, after the first and second ultrasonic welding processes are performed, the cap plate 130 may be placed on the can 20, and a third ultrasonic welding process may be performed along edges of the can 20 and the cap plate 130.

Referring to FIG. 13, the third ultrasonic welding process may be performed by placing the pair of third fixing blocks S3 on opposite sides of the can 20, pressing the horn H against overlapping portions of the can 20 and the cap plate 130 exposed between the pair of third fixing blocks S3, and applying ultrasonic vibrations from the horn H.

In the third ultrasonic welding process, the pair of second fixing blocks S3 may be arranged along the long sides (e) of the can 20, and the direction of vibration V may be set to be parallel with the short sides (f) of the can 20.

Referring to FIGS. 11 and 14, one of the can 20 or 20' and the cap plate 130 or 130' may include the stopping structure 21 or 131 for fixing the other of the can 20 or 20' and the cap plate 130 or 130'. Furthermore, in the third ultrasonic welding process, a weld zone W' may be formed along edges of the other of the can 20 or 20' and the cap plate 130 or 130' on which the stopping structure 21 or 131 is placed.

According to the exemplary embodiment, the terminal plate 129 is disposed between the first electrode tab 19 and the electrode terminal 139, and the first electrode tab 19 and the terminal plate 129 are coupled together by ultrasonic welding. The terminal plate 129 may be any conductive member disposed between the first electrode tab 19 extending from the electrode assembly 10 and the electrode terminal 139 extending outward from the case 100. However, the terminal plate 129 is not limited to a member separate and different from the electrode terminal 139. That is, for example, a portion of the electrode terminal 139 extending to the inside of the case 100 may function as the terminal plate 129.

As described above, according to one or more exemplary embodiments, ultrasonic welding is performed to join the first and second electrode tabs 19 and 17 to the terminal plate 129 and the cap plate 130. Thus, when compared to the case of using a fusing-type welding method, deterioration in appearance and defects, such as a short circuit caused by spatters, may be reduced or prevented.

In addition, because fixing blocks having smooth surfaces are used to fix a workpiece such as the terminal plate 129 or the cap plate 130 between the smooth surfaces, defects may be reduced or prevented from forming (or not remain) on the terminal plate 129 or the cap plate 130 after ultrasonic welding. Therefore, the aesthetic appearance of the secondary battery may be improved, and errors caused by damaged parts may be minimized or reduced.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims and their equivalents.

What is claimed is:

1. A method of manufacturing a secondary battery comprising an electrode assembly, a case configured to accommodate the electrode assembly, and an electrode terminal exposed from the case, the method comprising:
welding a first electrode tab to a terminal plate by a first ultrasonic welding process, the first electrode tab extending from the electrode assembly, the terminal plate being electrically connected to the electrode terminal and accommodated inside the case after performing the first ultrasonic welding process, and the first ultrasonic welding process comprising:
arranging a pair of first fixing blocks on opposite sides of the terminal plate;
pressing a horn against overlapping portions of the terminal plate and the first electrode tab exposed between the pair of first fixing blocks; and
applying first ultrasonic vibrations from the horn.

2. The method of claim 1, wherein the first ultrasonic vibrations are applied in a direction parallel with a direction in which the pair of first fixing blocks face each other.

3. The method of claim 1, wherein the pair of first fixing blocks are arranged along first sides of the terminal plate, and
wherein the first ultrasonic vibrations are applied in a direction parallel with second sides of the terminal plate, the first sides being longer than the second sides.

4. The method of claim 1, wherein in the first ultrasonic welding process, the terminal plate and the first electrode tab are coupled to each other in an overlapping manner on the same plane, and
wherein the method further comprises bending the first electrode tab after performing the first ultrasonic welding process such that the first electrode tab bends from the terminal plate.

5. The method of claim 1, wherein the pair of first fixing blocks have smooth surfaces facing the terminal plate.

6. The method of claim 1, further comprising welding a second electrode tab extending from the electrode assembly to a cap plate by a second ultrasonic welding process, the second ultrasonic welding process comprising:
arranging a pair of second fixing blocks on opposite sides of the cap plate;
pressing a horn against overlapping portions of the cap plate and the second electrode tab exposed between the pair of second fixing blocks;
and applying second ultrasonic vibrations from the horn.

7. The method of claim 6, wherein the second ultrasonic vibrations are applied in a direction parallel with a direction in which the pair of second fixing blocks face each other.

8. The method of claim 6, wherein the pair of second fixing blocks are arranged along first sides of the cap plate, and
wherein the second ultrasonic vibrations are applied in a direction parallel with second sides of the cap plate, the first sides being longer than the second sides.

9. The method of claim 6, wherein in the second ultrasonic welding process, the cap plate and the second electrode tab are coupled to each other in an overlapping manner on the same plane, and
wherein the method further comprises bending the second electrode tab after performing the second ultrasonic welding process such that the second electrode tab bends from the cap plate.

10. The method of claim 6, wherein the pair of second fixing blocks have smooth surfaces facing the cap plate.

11. The method of claim 6, wherein the case comprises:
a can configured to accommodate the electrode assembly; and
the cap plate configured to close an opening of the can, and
wherein the method further comprises welding the cap plate and the can after performing the first and second ultrasonic welding processes by a third ultrasonic welding process, the third ultrasonic welding process comprising:
arranging the cap plate on the can; and
ultrasonically welding the cap plate and the can along edges of the cap plate and the can.

12. The method of claim 11, wherein the third ultrasonic welding process comprises:
arranging a pair of third fixing blocks on opposite sides of the can;
pressing a horn against overlapping portions of the can and the cap plate exposed between the pair of third fixing blocks; and
applying third ultrasonic vibrations from the horn.

13. The method of claim 12, wherein the pair of third fixing blocks are arranged along first sides of the can, and
wherein the third ultrasonic vibrations are applied in a direction parallel with second sides of the can, the first sides being longer than the second sides.

14. The method of claim 11, wherein one of the can and the cap plate comprises a stopping structure configured to fix the other of the can and the cap plate, and
wherein in the third ultrasonic welding process, a weld zone is formed along edges of the other of the can and the cap plate placed on the stopping structure.

* * * * *